Nov. 15, 1938.   E. A. ROCKWELL   2,136,638
ELECTROFLOW POWER SUPPLY SYSTEM
Filed June 27, 1935   12 Sheets-Sheet 1
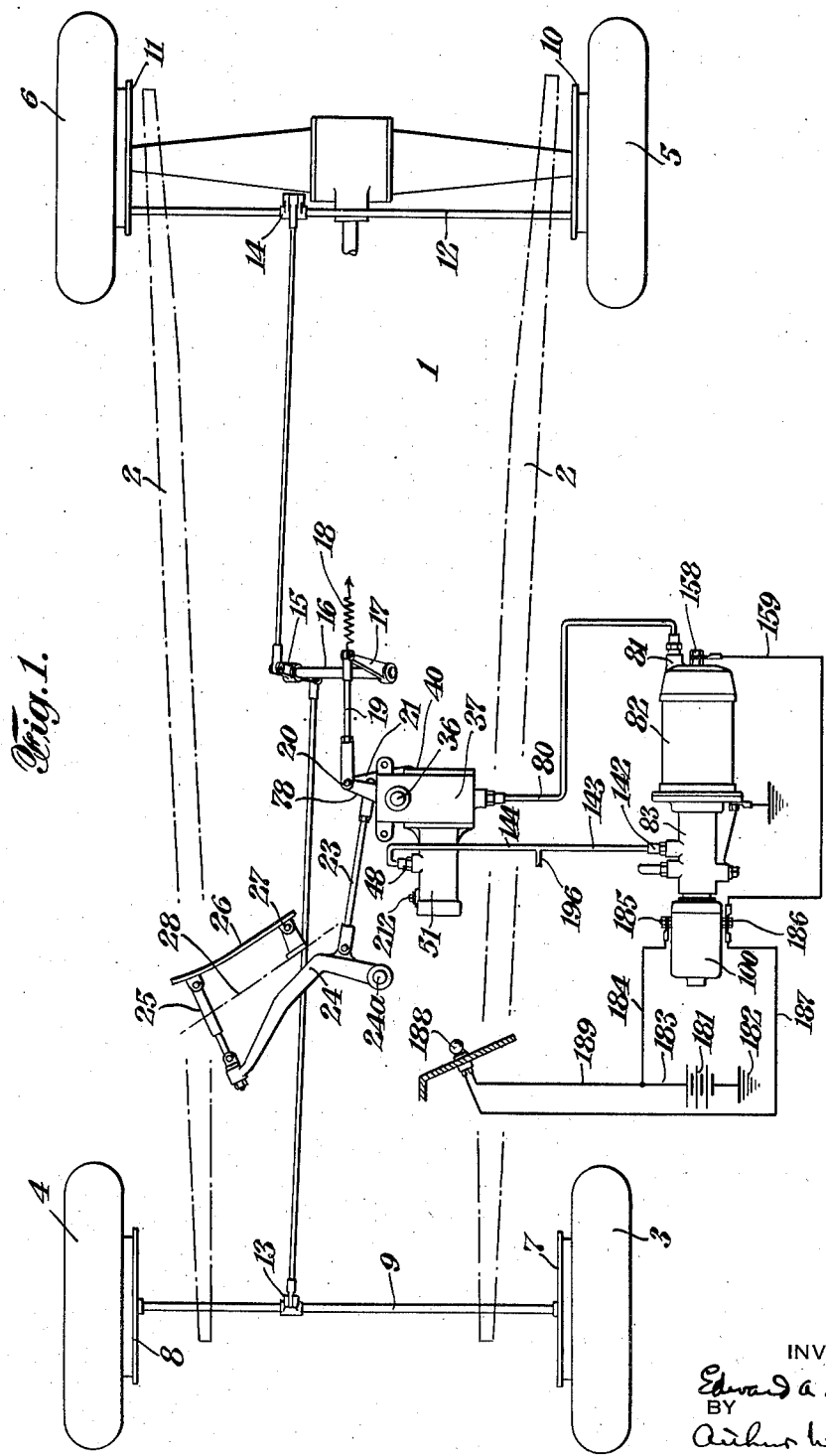
INVENTOR
Edward A. Rockwell
BY
Arthur Wright
ATTORNEY

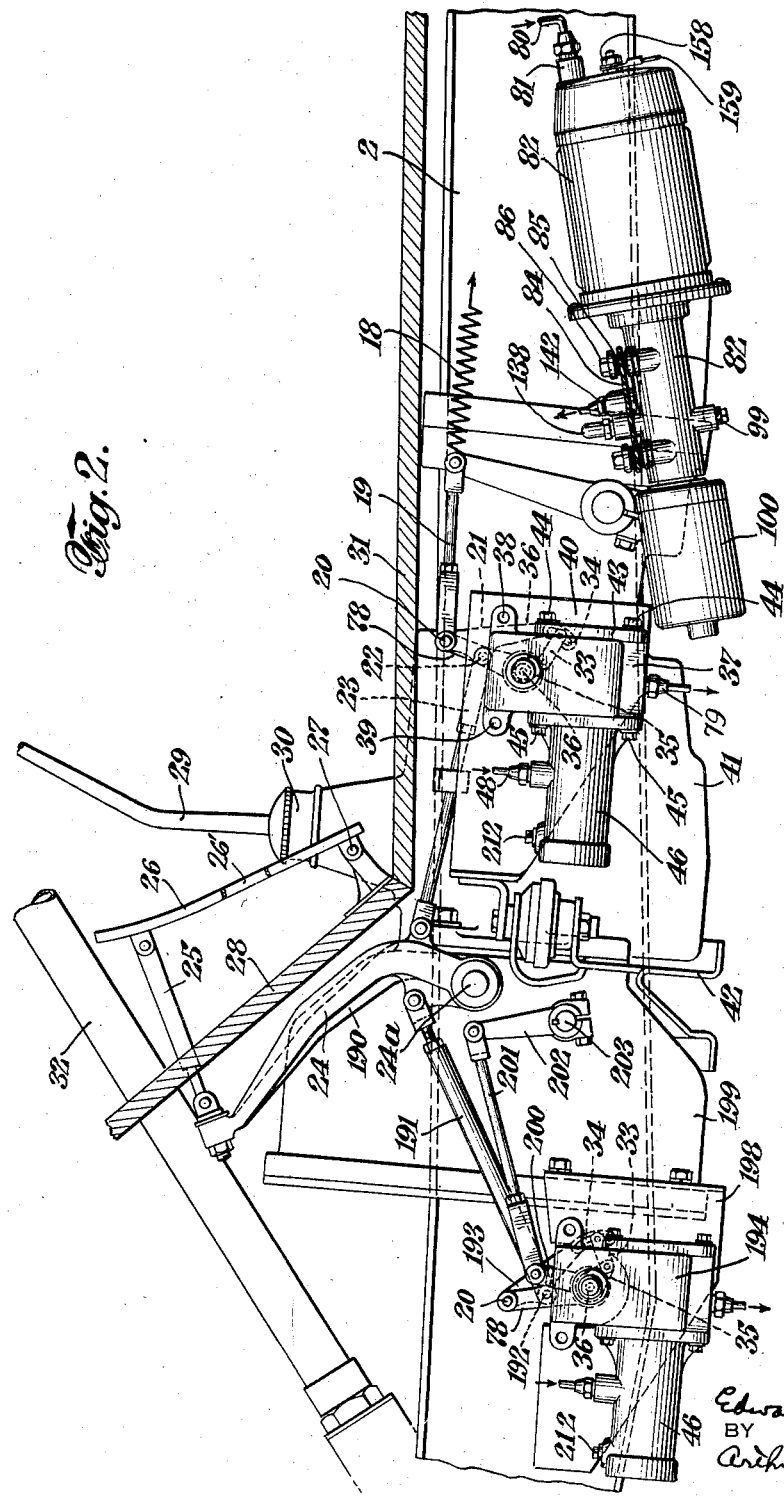

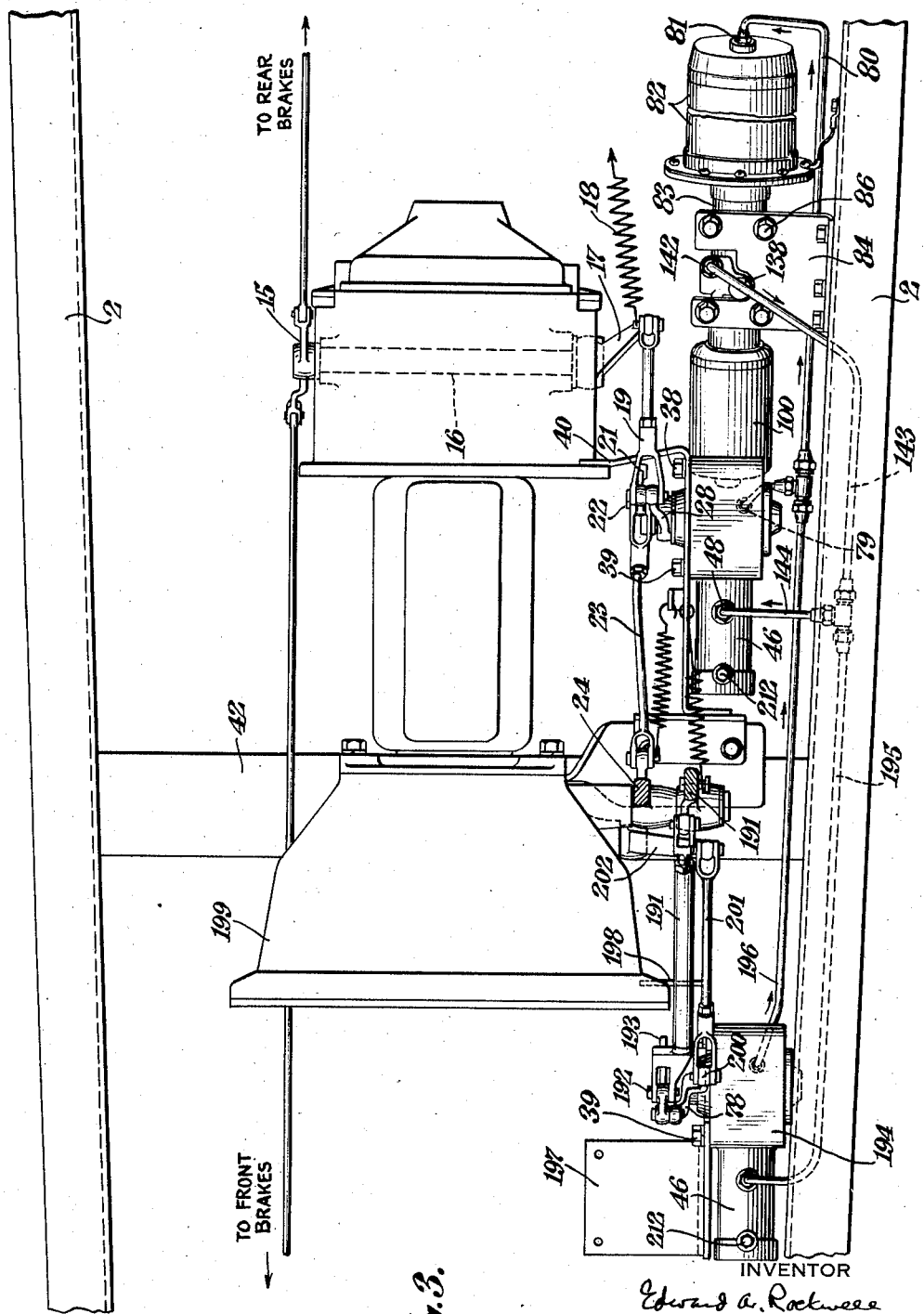

Nov. 15, 1938.  E. A. ROCKWELL  2,136,638
ELECTROFLOW POWER SUPPLY SYSTEM
Filed June 27, 1935   12 Sheets-Sheet 4
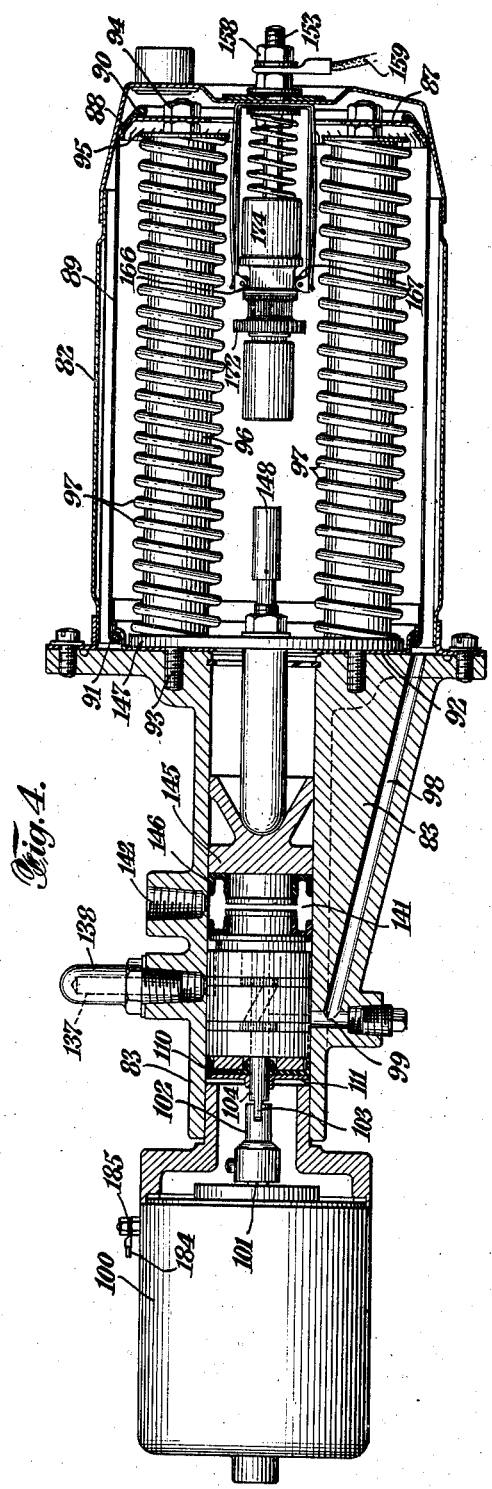
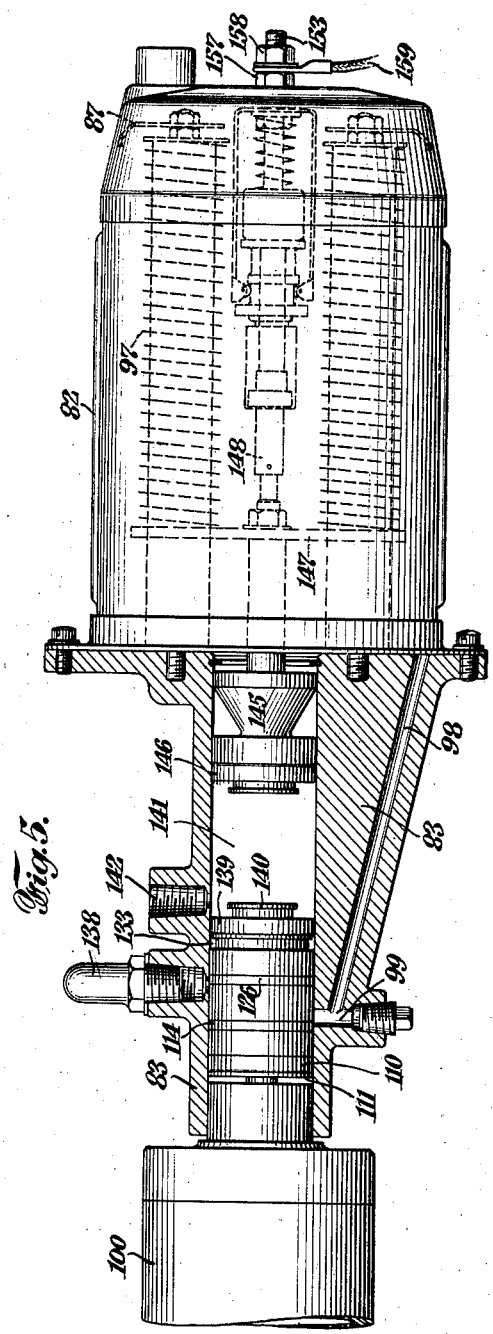
INVENTOR
Edward A. Rockwell
BY
Arthur Wright
ATTORNEY

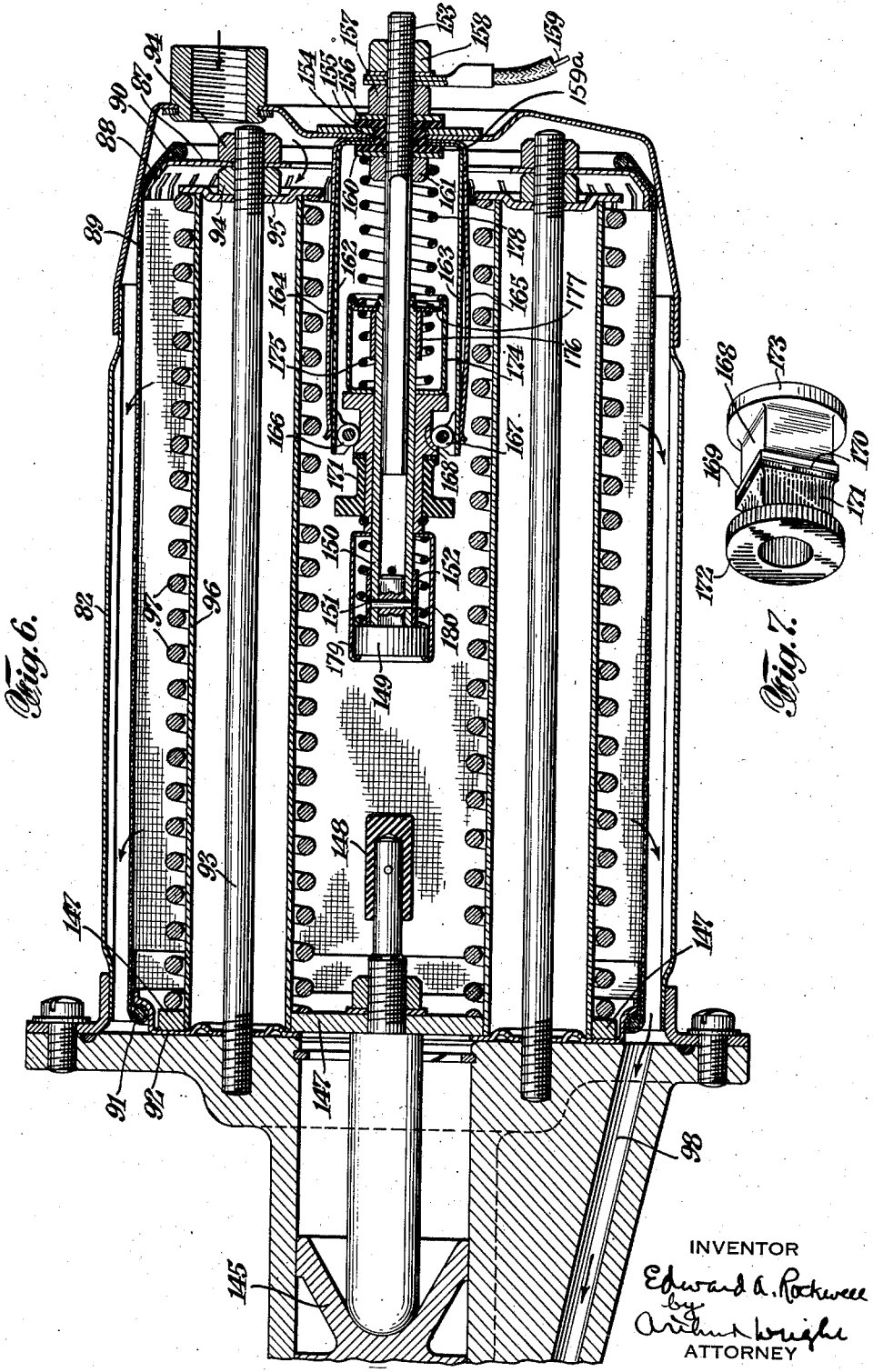

Nov. 15, 1938.　　　　E. A. ROCKWELL　　　　2,136,638
ELECTROFLOW POWER SUPPLY SYSTEM
Filed June 27, 1935　　12 Sheets-Sheet 6
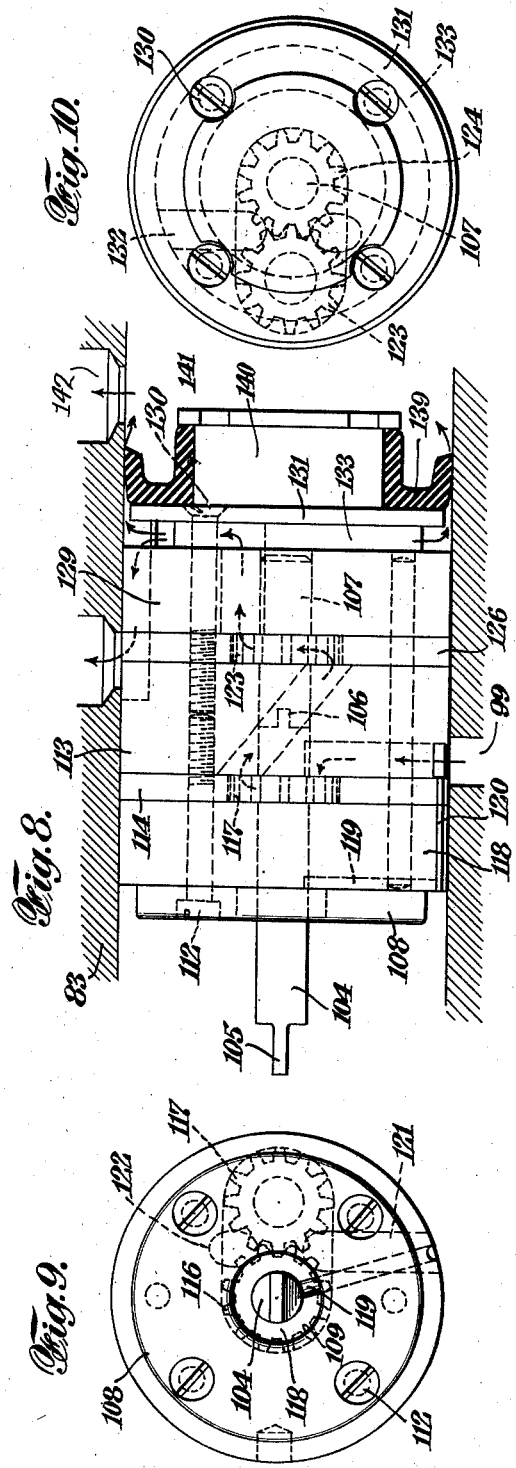
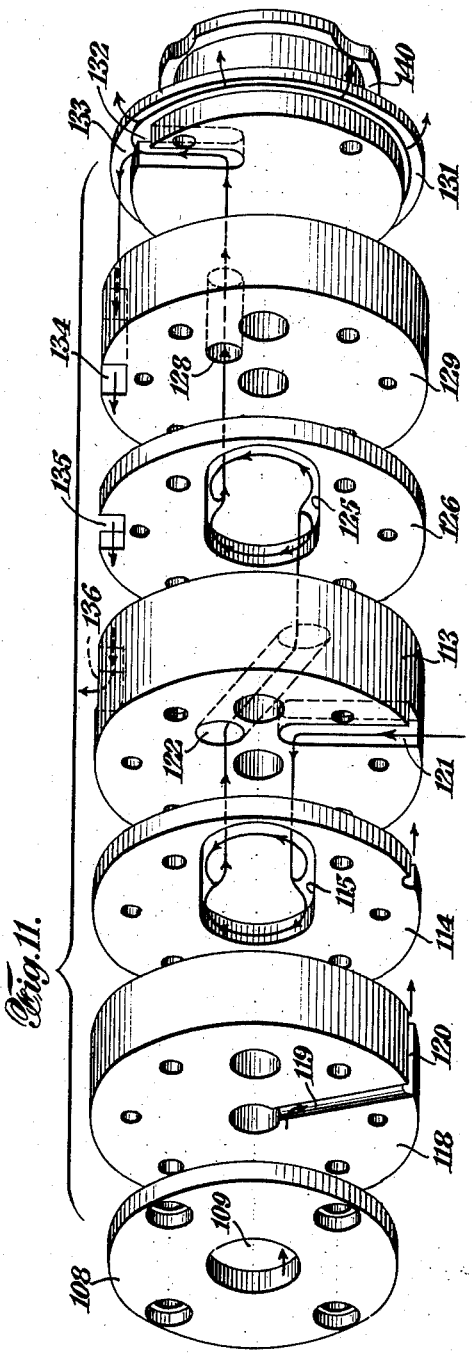
INVENTOR
Edward A. Rockwell
BY
Arthur Wright
ATTORNEY

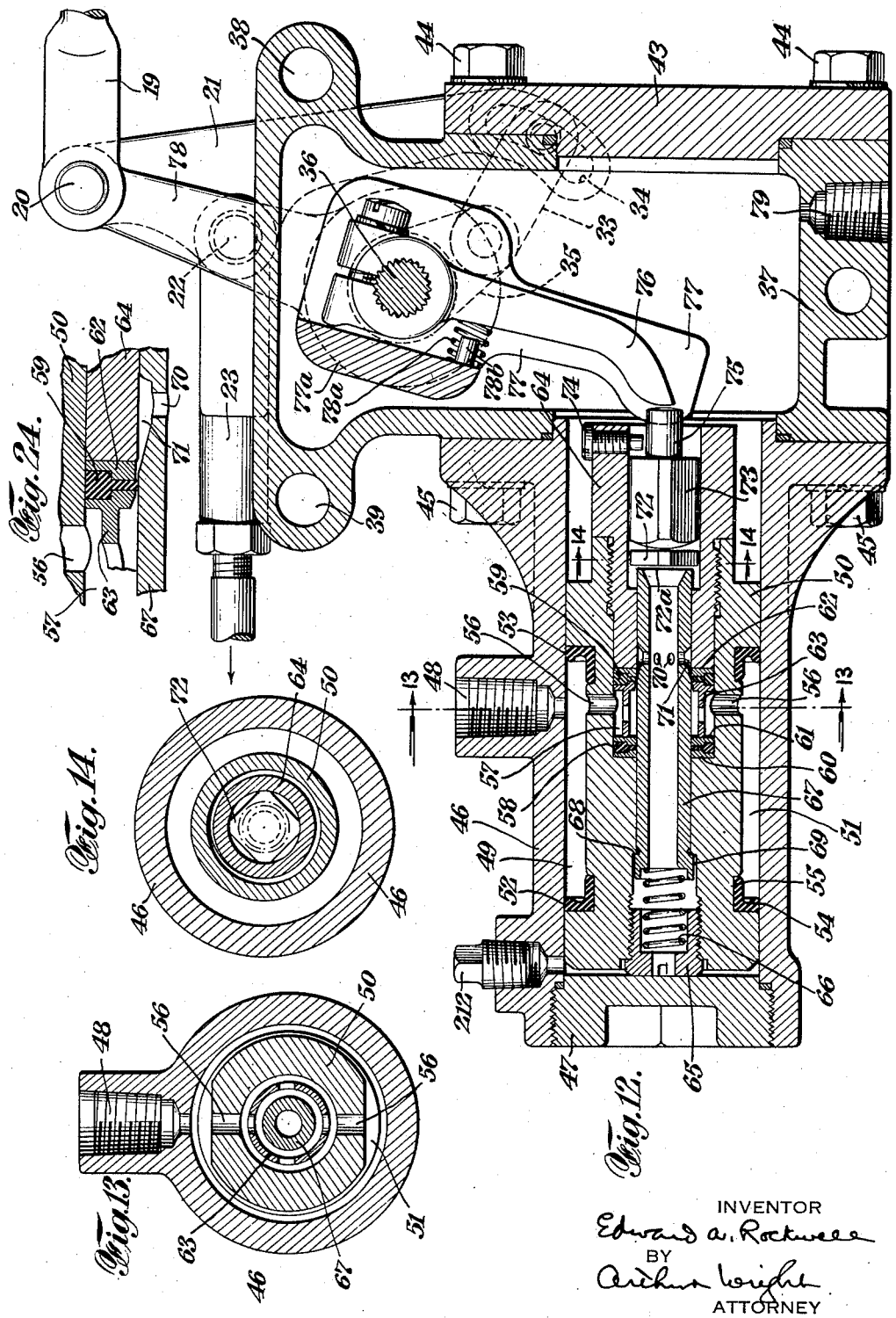

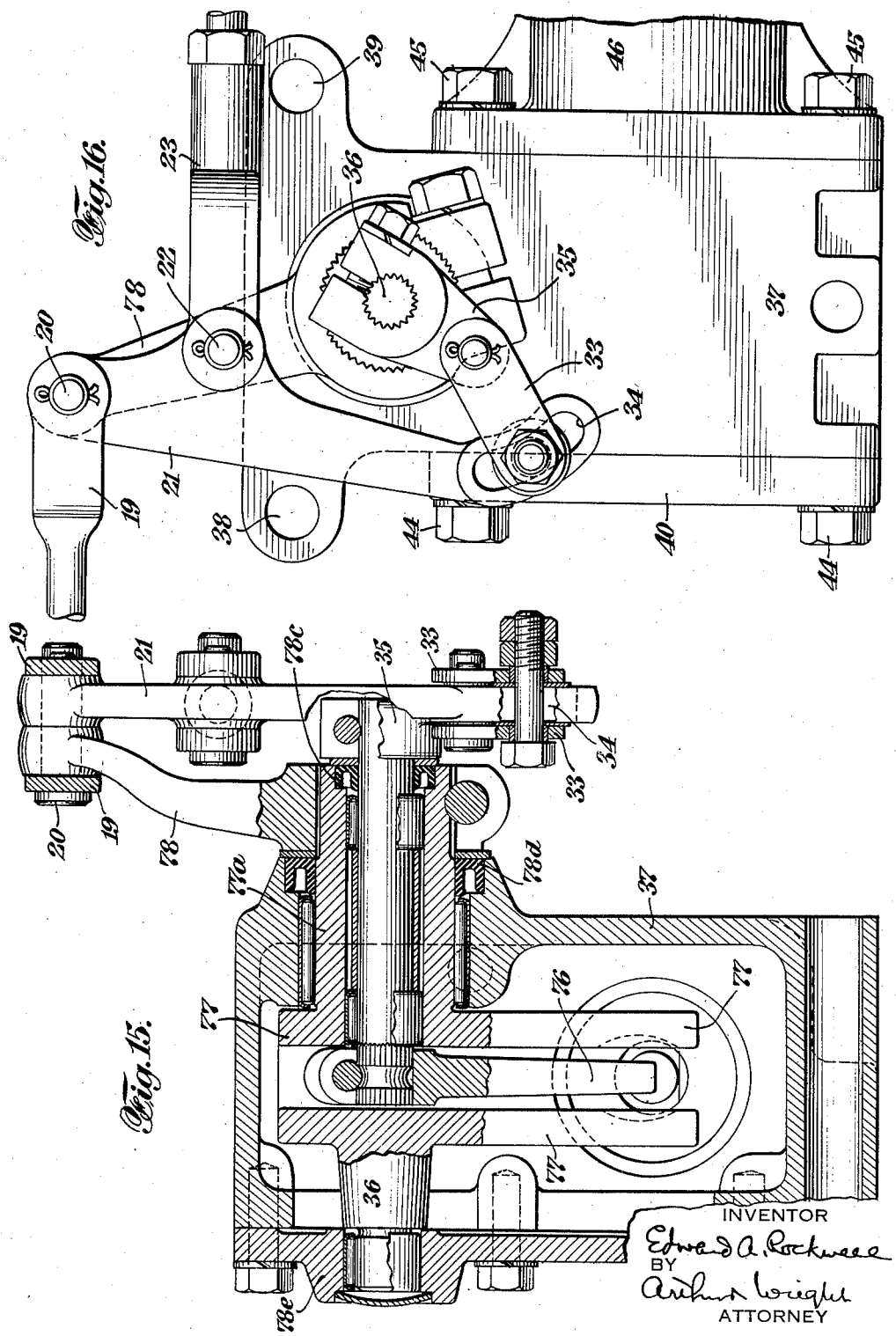

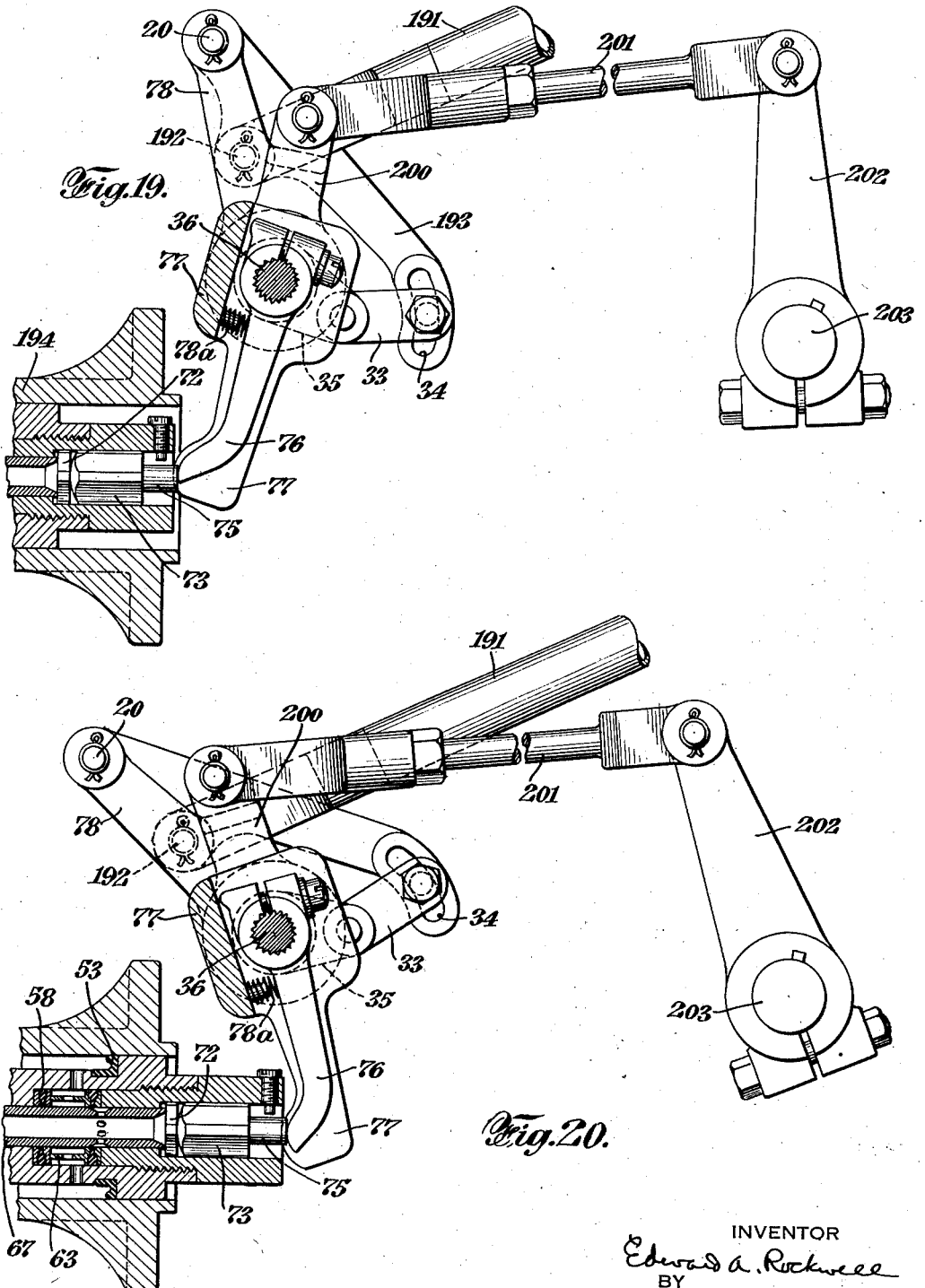

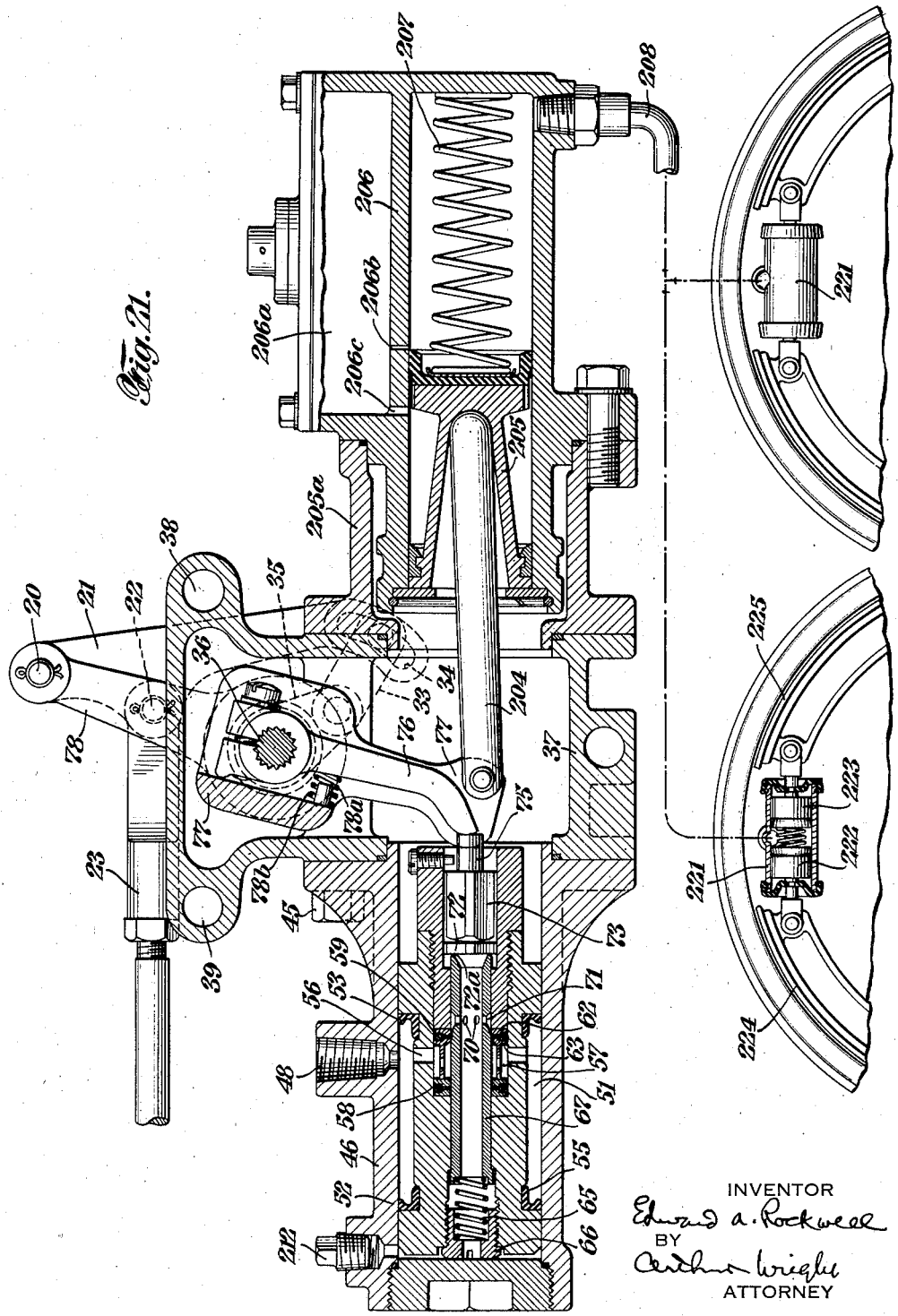

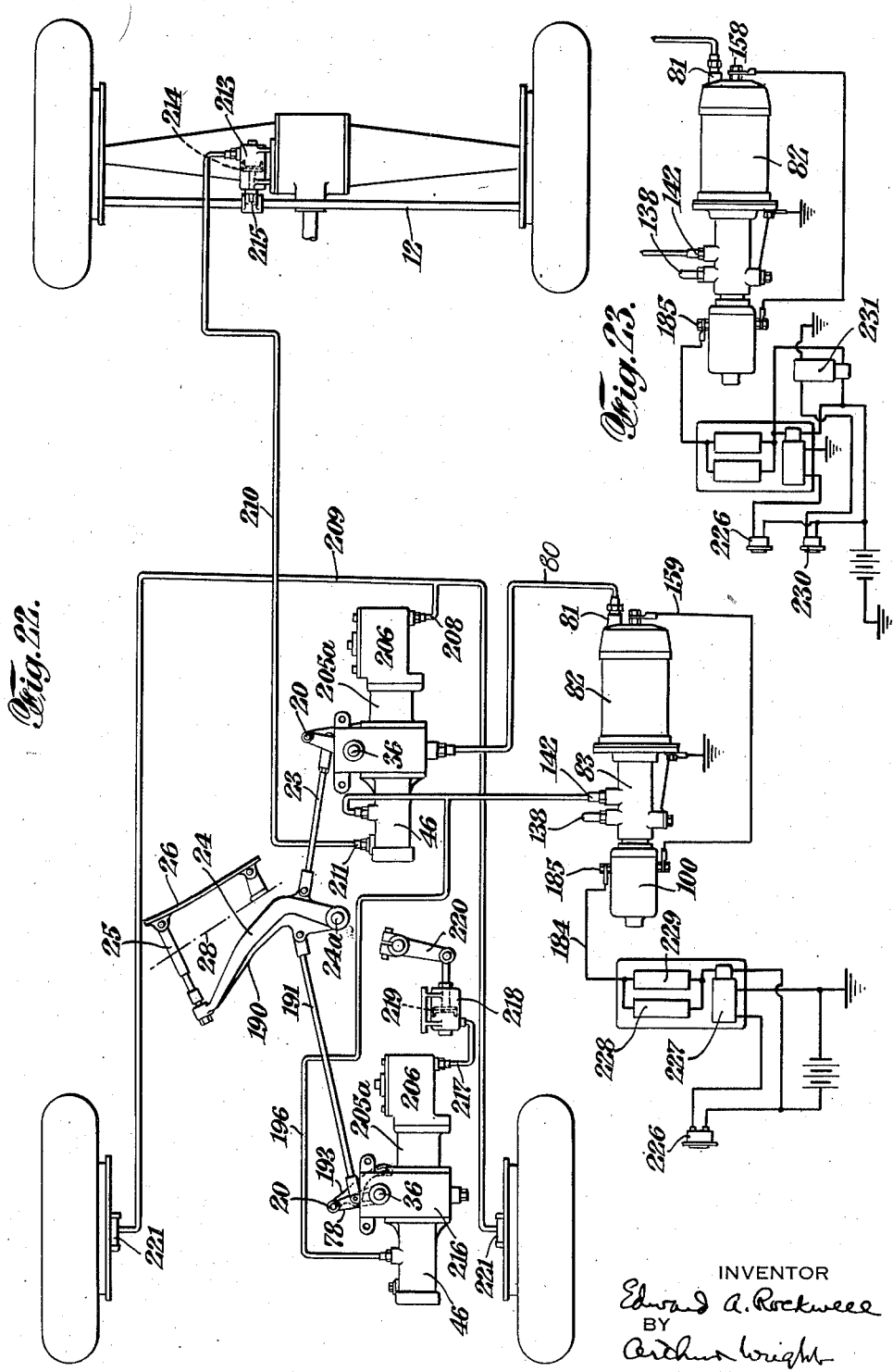

Patented Nov. 15, 1938

2,136,638

UNITED STATES PATENT OFFICE 2,136,638

ELECTROFLOW POWER SUPPLY SYSTEM

Edward A. Rockwell, Forest Hills, Long Island, N. Y., assignor, by mesne assignments, to General Auto Parts Corporation, a corporation of Delaware Application June 27, 1935, Serial No. 28,699

6 Claims. (Cl. 188—152)

My invention relates particularly to a system designed for the effective supply of power generally, but has especial application to the supply of power for the operation of the accessories of automotive vehicles.

The object of my invention is to provide an effective system for the supply of power wherever desired, but especially in connection with automobiles, as in the case of the operation of the automobile accessories. By means of my invention the different accessories of an automobile may be effectively operated by power in addition to the manual power applied thereto, but coordinated in extent to the manual pressure applied. It is particularly useful in connection with the operation of automobile brakes of any desired character, whether mechanical power brakes or hydraulically operated brakes. The same is true, also, in regard to the operation of clutches, which may be operated by the same system used for operating the brakes, it being understood, however, that either the brakes or the clutch, or both, may be so operated on the automobile. A further object is to provide a liquid medium for transmitting the additional power, and which is controlled by the presence of sealing rings carried by the relatively moving parts. The rings are so constructed as to be unaffected by the liquid used, and preserve completely-tight joints without leakage and without the interposition of springs.

My apparatus, furthermore, is based on the use of a liquid under pressure, which is, however, utilized at any given time in only small amounts of the liquid, but which has a storage capacity under pressure so that there is no appreciable lag in the operation of the apparatus. This requires, therefore, only a small electric motor and pump, which are not operated much of the time, so that there is only a small drag on the electric battery. Also, there is used a system of valve seals permitting the use of a low viscosity liquid. There is also provided an arrangement of interchangeable parts so that additional units may be provided in the system at a low cost.

Further objects of my invention will appear from the detailed description of the same hereinafter.

While my invention is capable of being carried out in many different ways, for the purpose of illustration I have shown only certain forms of my invention in the accompanying drawings, in which—

Fig. 1 is a diagrammatic view of an automobile equipped with my invention as applied to the operation of brakes;

Fig. 2 is a longitudinal elevation of the same partly in section and having added thereto the clutch actuating mechanism;

Fig. 3 is a plan view of the same;

Fig. 4 is an enlarged vertical section of the accumulator and pump with the attached motor, in the position in which it is ready to accumulate pressure;

Fig. 5 is a similar view showing the accumulator with the pressure fully accumulated therein and with the switch in the position in which it has broken the circuit supplying the motor;

Fig. 6 is an enlarged vertical section of the accumulator;

Fig. 7 is a perspective view of the switch sleeve;

Fig. 8 is a longitudinal elevation partly in section, showing the pump;

Fig. 9 is an elevation of the pump taken from one end thereof;

Fig. 10 is an elevation of the pump taken from another end thereof;

Fig. 11 is a perspective view showing the disassembled elements of the pump;

Fig. 12 is a vertical section, enlarged, showing the booster unit for the brake;

Fig. 13 is a vertical section of the same taken on line 13—13;

Fig. 14 is another vertical section of the same taken on line 14—14;

Fig. 15 is a transverse vertical section showing the said booster unit;

Fig. 16 is an end elevation showing the said booster unit;

Fig. 19 is a similar view to Fig. 17 but showing, instead, the leverage connection to the clutch and clutch pedal;

Fig. 20 is a similar view to Fig. 18, but showing the connections to the clutch and clutch pedal;

Fig. 21 is a vertical section of the booster unit shown as applied to the operation of the hydraulic brake system;

Fig. 22 is a diagrammatic view showing the hydraulic brake system;

Fig. 23 is a plan view showing another form of operating circuit; and

Fig. 24 is an enlarged section showing the position of the valve in the booster when closed.

Figure 17:
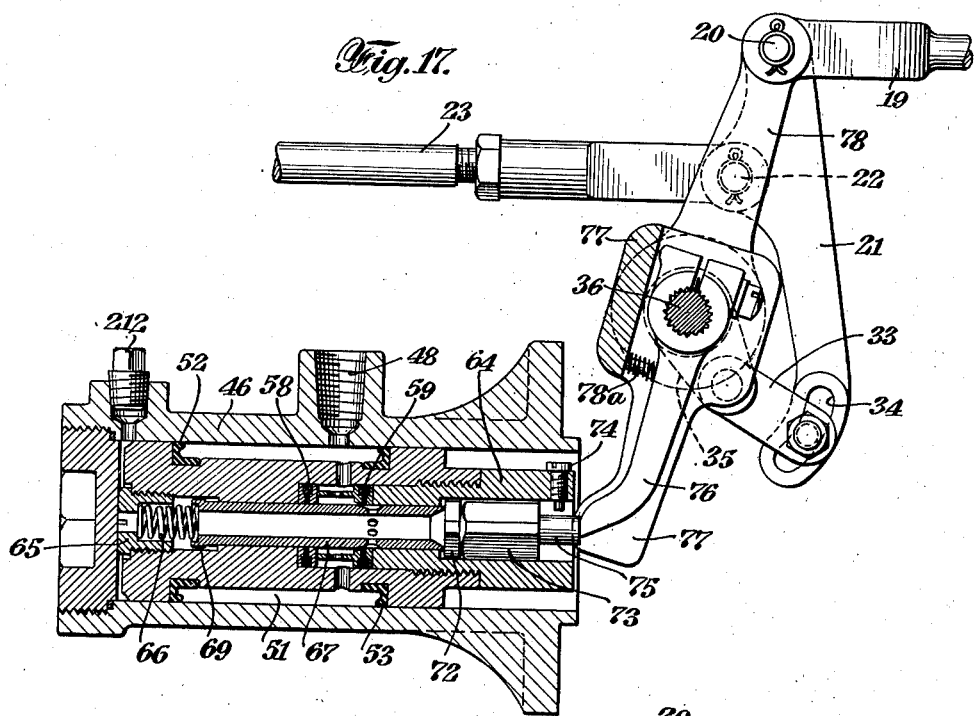
Fig. 17 is a vertical section of the booster unit showing the levers in the position in which the additional power is beginning to be applied in the boosting of the brake.
Figure 18:
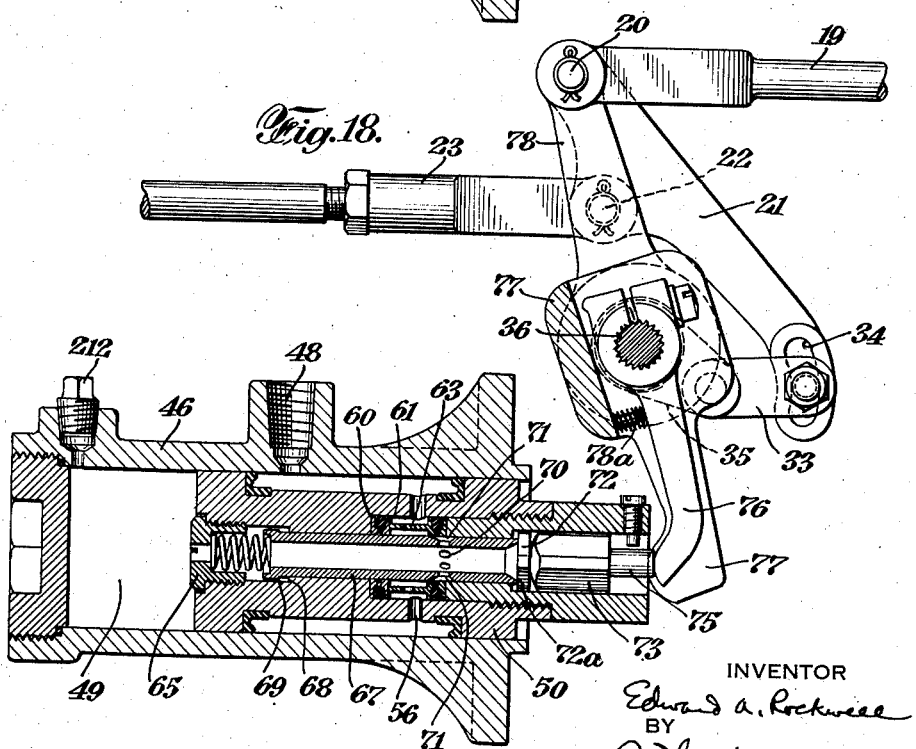
Fig. 18 is a similar view showing the position of the levers after the boosting power has been applied and the parts have come to a static position with the pressure of the booster balanced against the foot pressure.

Referring first to the mechanically operated system for operating the brake or clutch, or both, I have shown, in Fig. 1, an automobile 1 having a frame 2 for connection in the usual way with front wheels 3 and 4 and rear wheels 5 and 6. The front wheels 3 and 4 are provided with brakes 7 and 8, of any desired type, which are operated by a cross-shaft 9. Similarly, the rear wheels 5 and 6 are provided with brakes 10 and 11 of any desired type, which are operated by a cross-shaft 12. The shafts 9 and 12 are provided with operating levers 13 and 14, respectively, which lead to the opposite ends of a rocker lever 15 carried near the center thereof upon a cross-shaft 16, on one end of which there is an operating lever 17. The lever 17, at its end, is provided with a pull-back spring 18 fastened to the frame 2 in any desired way, and a link 19 which leads to a pivot 20. On the pivot 20 there is also carried a manually-actuated lever 21 which is connected by a pivot 22 to a link 23, pivoted in turn to a brake lever 24 which is pivoted on a shaft 24a, the outer end of which is connected by a link 25 to a brake pedal 26 supported on a pivot 27 carried in a bracket on a toe-board 28. The brake pedal 26 is located in the usual way, adjacent to a transmission control lever 29 which passes into a tower 30 projecting through a floor-board 31, the same being also adjacent to a steering column 32 for steering the front wheels 3 and 4 in the usual way. When pressure is applied to the brake pedal 26 the lever 21 is moved upon the pivot 20 as the reaction point and thence transmits the manual movement to a link 33 which has an adjustable pivotal support in a curved slot 34 at the end of said lever 21. The link 33, in turn, is connected to a lever 35 which is tight on a shaft 36 which is journaled in a rear booster housing 37, mounted by means of bolts 38 and 39 upon a bracket 40, one end of which is supported from a transmission casing 41 and the other end of which is suitably connected to a cross-member 42 of the automobile frame. The said rear booster housing 37 is closed at the rear with a cover plate 43 secured thereon by screws 44 and the rear booster housing 37 is secured by screws 45 to a main booster housing 46 closed at the forward end thereof with a screw-cover 47.

The liquid for transmitting the boosting power is of any desired character, as, for example, the usual hydraulic brake fluid, but may, for instance, be comprised partly of castor oil, and preferably more castor oil for lubrication than in the usual hydraulic brake liquid, and in which there is carried a large amount of a constituent to prevent freezing under all atmospheric conditions, such, for example, as an alcohol. The alcohol added thereto also makes the liquid less viscous. This liquid is supplied under pressure by an inlet port 48 in the top of a main booster housing 46 and thence into a cylindrical chamber 49 therein in which a plunger 50 is arranged to reciprocate. The plunger 50 has an annular recess 51, the two ends of which are closed by sealing rings 52 and 53 which are of any desired composition, but preferably a rubber, and for this purpose there may be advantageously used what is known as "rosin rubber" such as is used in hydraulic brakes and which is unaffected by the liquid which conveys the power, as above referred to. It will be noted that each of these rings 52 and 53 has an outer sealing lip, or flange, 54, which prevents any leakage around the periphery of the same, but which, because of its small size, does not exert undue friction. Also, the inner portion of the ring is provided with a longer lip, or flange, 55 which retains the ring against the plunger 50 to prevent any leakage beneath the same. The flanges 54 and 55 are sealed by opposing radial pressures. Due to the opposed faces of the rings 52 and 53, the presence of the liquid in the annular space 49 will not move the plunger 50. From this point the liquid, under pressure, passes by a series of radiating ports 56 to an internal annular recess 57 in which there are two annular sealing rings 58 and 59 of the same kind of rubber as above, carrying outer circular shoulders to prevent their entering the valve ports hereinafter described, said rings being clamped in place so as to produce effectively-sealing internal surfaces of a reduced area, by means of rings 60, 61 and 62 and a perforated spacing ring 63 with the aid of a hollow head 64 screw-threaded into the end of the plunger 50, the edges of the seals 58 and 59 being beveled to permit the rubber to expand into the corners under pressure and so as to prevent the inner peripheries from exerting too much friction in the movement of the valve 67. In this way sticking is prevented. In the interior of the plunger 50 there is provided at the other end, a hollow screw-threaded plug 65 carrying a spring 66 therein which tends to press towards the rear a tubular valve 67 having a shoulder 68 to act as a stop against a shouldered bore 69, in which the tubular valve 67 reciprocates. Near the rear end of the tubular valve 67 there are a plurality of radiating ports 70 which communicate with a tapered recess 71 leading to the exterior of the tubular valve and so as to establish communication with the annular space 57 when the valve 67 is moved forwardly. The forward movement of said valve 67 is accomplished manually by pressure exerted upon a squared port-closing member 72, which is adapted to close a port 72a which is smaller in area than the area at the forward end of the valve to prevent chattering. The over-balancing effect of the spring 66 also tends to prevent the chattering effect. The member 72 is operated by the movement of a squared plunger 73 held in the head 64 by a screw 74 and which has an operating stem 75 contacting with the end of a lever 76 tight on the shaft 36. When the liquid under pressure is admitted to the interior of the tubular valve 67 by the forward movement of the latter, due to the movement of the lever 76 by the brake pedal, the recess 71 will be brought into communication with the annular recess 57 admitting the oil under pressure to the bore within the tubular valve 67 so that the pressure of the liquid will then be exerted through the opening in the closure 65 against the cover 47 at the front end of the booster and the pressure thus produced at the front end of the plunger 50 will cause said plunger to move rearwardly until the pressure on the plunger 50 has equalized the pressure applied by the foot, it being understood that when this takes place the spring 66 will have closed the ports 70 by causing the sealing ring 59 to overlie the external cylindrical portion of the tubular valve 67, as shown in Fig. 24. The pressure thus exerted on the plunger 50 by the liquid at the forward end thereof will be transmitted to a forked lever 77 which is carried by a sleeve 77a on the shaft 36 and which sleeve 77a has tight thereon a lever 78 connected to the pivot 20 so that a boosting force will be applied to the brake operating link 19 connected to all of the wheels of the automobile, commensurate with the extent of the foot pressure applied by the pedal 26. A spring 78a, on a stud 78b, on the sleeve 77a, tends to restore the levers 76 and 77 to their initial positions and enables the lever 76 to be moved initially without moving the levers 77. To prevent leakage around the shaft 36 and the sleeve of the lever 77, said shaft 36 is journaled within the sleeve 77 on roller bearings and leakage at this end of the sleeve 77 is prevented by a flanged sealing ring 78c of the rubber material above referred to, and the same end of the sleeve 77 is sealed by a similar sealing ring 78d around the sleeve 77 and within the housing 43. The other end of the sleeve 77 is journaled in a sealed socket in a cover plate 78e on one side of the housing 37. When it is desired to release the pressure from the brakes the decrease of the pressure on the pedal 26 will cause the release, partly or wholly, of the lever 76, thereby permitting the pressure liquid to spill out or escape past the squared plunger 73 to an outlet port 79 in the bottom of the rear housing 37, and thence to a tube 80 which leads to a low pressure port 81 in a pressure accumulator and supply reservoir 82, which is made of thin metal. The supply reservoir 82 is mounted upon a pump casing 83 and is supported by a bracket 84 between rubber washers 85 on screws 86 screwed to the pump casing 83. The bracket 84 is secured on the frame 2. The low pressure liquid passes from the port 81 through a filter-supporting head 87 having a slitted flange 88 to hold tight against the inner face of the casing 82 an annular cloth 89, the rear end of which passes around a ring 90 supported beyond the filter head 87. The other end of the filter cloth 89 is supported by a ring 91 against a flanged disk 92. The disk is secured against the pump housing 83 by means of six screw-threaded rods 93. The upepr ends of said rods support the head 87 between nuts 94 on the rods 93. The rods 93, furthermore, support against the face of the nuts 94, a plurality of washers 95, the nuts 94 serving to clamp between said washers 95 and the disk 92, a plurality of tubes 96 which serve, not only to space the washers 95 away from the disk 92, but also to keep the filter cloth 89 taut and, furthermore, to act as guides for six accumulator springs 97, each of which surrounds a tube 96. The springs 97 are provided to accumulate stored pressure in the reservoir 82 by their further compression, it being understood, furthermore, that the springs 97 are piled into the reservoir initially under great pressure so that when these springs are further compressed to the maximum within the reservoir 82, they will exert upon the liquid a pressure, for example, of 500 lbs. per square inch, which is the stored pressure under which the apparatus preferably operates in supplying the liquid under pressure in the operation of the system. The liquid, after passing through the filter cloth 89, will enter a return passageway 98 in the pump casing 83 and will thence pass through a low pressure return inlet 99 to the pump which is driven by an electric motor 100 having a shaft 101 arranged to be connected by a driving sleeve 102 having a slot 103 with a pump shaft 104 having a tongue 105 at the forward end thereof. The pump shaft 104 is connected at its other end by a rearward tongue 106 with an auxiliary pump shaft 107. On the shaft 104 there is a forward end plate 108 having a central port 109 which is situated just in the rear of a sealing ring 110 of the same rubber as hereinabove referred to, and which is positioned on the shaft 104 by a retaining plate 11. The end plate 108 has four screws 112 therein for clamping the same to a central stationary pump member 113 into which they are screw-threaded. Between the end plate 108 and the pump member 113 there is a gear housing 114 having a recess 115 for pump gears 116 and 117, the gear 116 being doweled on the end of the shaft 104. Between the pump member 114 and the end plate 108 there is a spacing member 118 which has a radial passageway 119, conveying any oil away from the opening 109 and thence by a peripheral passageway 120 to the inlet port 99, so that the incoming oil is supplied from the port 99 through a radial port 121 in the central member 113 to one side of the gears 116 and 117, by the rotation of which the liquid is discharged from the other side of said gears through an inclined passageway 122, also in the central pump member 113 to one side of a pair of gears 123 and 124 located in an opening 125 in a pump member 126, one of which is tight on the auxiliary shaft 107. The liquid passes from the outlet side of the gears 123 and 124 into a passageway 128 in a spacing member 129 located around the shaft 107 and which is clamped to the central pump member 113 by screws 130 which pass through a rear end plate 131. The liquid under pressure, after passing through the passageway 128, proceeds in a radial direction through a slot 132 in the end plate 131 and thence into an annular passageway 133 around the same, so that the liquid at this point may take a double path, one path being forwardly through a peripheral port 134 in the spacing member 129 and thence through a port 135 in the member 126 and a passageway 136 to an impact cushion-chamber 137 in a removable dome 138 on the pump casing 83, to relieve the initial starting torque, but the main flow of the liquid passes around the outer periphery of the end plate 131 and thence past an annular rubber seal 139 which is retained in an annular recess 140 on a rearward extension of the end member 131. The liquid thus discharged around the annular rubber ring 139 is received in a pressure reservoir 141 in the pump casing 83 from which it is supplied through an outlet port 142 by a flexible tube 143 to a branched tube 144 leading to the inlet port 48 of the booster. The pressure built up in the chamber 141 by the rotation of the gears 116 and 117, 123 and 124, is communicated to a piston 145, having on its face a sealing ring 146 of the same rubber material, in the pressure reservoir 141, which piston carries a compression plate 147 thereon inside the casing 82. The compression plate 147 supports the forward ends of the springs 97. Thus, as the pressure accumulates in the chamber 141 the compression plate 147 is gradually pushed to the rear until a Bakelite circuit breaker 148, secured to the piston 145, breaks the electrical circuit which drives the motor 100. For this purpose the circuit breaker 148 is brought into contact at the rear part of its path of movement with a button 149 carried on the end of a slidable sleeve 150, and which is secured thereto by a rivet 151 which also passes through a stop sleeve 152 on the outside of a sleeve 150 which in turn is supported in the end of the casing 82 by a Bakelite plug 154 and Bakelite and metallic washers 155 and 156, as well as nuts 157 and 158 between which the end of a circuit wire 159 is clamped. It will be noted that on the screw-threaded end of the rod 153, in front of the Bakelite plug 154, there is a Bakelite washer 159a, a washer 160 and a nut 161 which serve to clamp in place two grounded contact arms 162 and 163 which have leaf springs 164 and 165, respectively, above the same. The inner ends of these contact arms 162 and 163 carry rollers 166 and 167, respectively, which are arranged to ride on the squared face of a slidable conducting sleeve 168 mounted on the sliding sleeve 150. At its forward end the conducting sleeve 168 has a flange 169 and next to it a mica disk 170 acting as a spark arrester and in front of this a Bakelite non-conducting sleeve 171, also squared, and having a limiting flange 172 at its forward end similar in shape to a limiting flange 173 at the rear end of the sleeve 168. At the rear of the flange 173 there is a spring housing 174 which contains a light spring 175 around a stop sleeve 176, the rear end of the spring 175 being supported against a flanged disk 177, on the other side of which there is a stronger spring 178 resting against the washer 160. At the forward end of the sleeve 150 there is a spring housing 179 which encloses a light spring 180. This arrangement is such that when the circuit breaker 148 pushes the button 149 to the rear, this direction of movement will be continued until the rear end of the sleeve 152 reaches the rear portion of the spring housing 179 and thereafter the slight added push on the button 149 will cause the rollers 166 and 167 to snap onto the non-conducting sleeve 171 through the action of the spring 180. The spring 180 of itself is not strong enough to snap the rollers 166 and 167 onto the non-conducting ring 171. In the reverse movement, after the circuit breaker 148 has released the button 149, when the liquid pressure is low enough to permit this forward movement of the circuit breaker 148, the spring 178 moves the sleeve 176 forwardly until it contacts with the forward end of the spring housing 174, wereupon a slight added push will induce the spring 175 to snap the rollers 166 and 167 into the position shown in Fig. 6. The circuit arrangement, including the electric motor 100 and the switch just described, comprises a battery 181, one side of which is connected to the ground 182 and the other side of which is connected by a wire 183 and a wire 184 to one pole 185 of the motor 100. The wire 159 leads to the remaining pole 186 of the motor 100. Preferably, also, this pole 186 is connected by wire 187 to a dash light 188 connected by a wire 189 to the wire 184, so that whenever the current is being supplied to the motor 100, due to the lightened pressure in the liquid, the dash light 188 will be illuminated. Inasmuch as only very little liquid is utilized in the operation of the booster there is only a very little drop in the pressure at any time, and, therefore, the dash light 188 will only be illuminated at infrequent intervals. During the time when the valve 67 is in closed position there is no escape of the liquid whatever.

When it is desired to operate a clutch, with the aid of a booster in a similar way, there is provided for this purpose any suitable clutch operating pedal, 26', which is constructed just like the brake pedal 26, which clutch pedal operates a lever 190 rotatably mounted on the shaft 24a and which lever is connected by a push-link 191 to a pivot 192 on a lever 193 which is constructed the same as the lever 21 previously described. This lever 193 is connected to a booster unit 194 constructed exactly the same as the booster unit previously described, and which is supplied with the high pressure liquid by a flexible branch tube 195 leading to the tube 143, the low pressure liquid returning by a flexible tube 196 to a branch of the pipe 80. This booster unit 194 is mounted upon a supporting plate 197 which has a bracket 198 supported from a bell-housing 199 provided for any usual type of clutch mechanism. In this instance, inasmuch as the throw to be provided for the clutch is less than would be used in the movement of the lever 78 to actuate the brakes, I have provided, also tight on the sleeve 77a, for the clutch a short lever 200 which is connected by a pull-link 201 to a clutch operating lever 202 on a clutch shaft 203, so that when the link 201 is moved in this manner by the booster unit 194 the usual springs for keeping the clutch in engagement will be moved so as to release the clutch when the clutch pedal is depressed.

When it is desired to apply the mechanism to the operation of hydraulically controlled automobile accessories, this may be readily done, as shown in Fig. 21. In this construction the parts are all arranged exactly as previously described herein, except that in this instance the power output, or booster action, is not accomplished by mechanical connections merely. In this instance the lower ends of the levers 77, in actuating the brake, are connected by a link 204 to a piston 205 in a master-cylinder 206 of the same type as customarily used in connection with hydraulic pressure systems, said cylinder 206 having an adapter 205a, a supply chamber 206a with a supply port 206b, and a leakage-return-port 206c, and a spring 207 which serves to retract the piston 205 as well as the levers 77. The cylinder 206 is connected by a hydraulic line 208 to a brake-operating line 209 leading to the front brake, which in this instance, it will be seen, are manually actuated as well as being boosted by the hydraulic pressure. In this instance the rear brakes can be operated by an hydraulic line 210 leading from a port 211 in the forward end of the booster cylinder 46, which end of the cylinder would be otherwise normally closed by a plug 212. The hydraulic line 210, for the operation of the rear brakes, may operate the same at the rear of the car in substantially the same fashion in which the wheel brakes in the front of the car would be operated, that is to say, by admitting the liquid under pressure to the cylinder 213 which operates a piston 214 connected to a lever 215 on the rear brake operating rod 12. However, if desired, instead of using a construction involving the cylinder 213 and the piston 214, I may mount on the brake bands of each of the wheels, either in the front or in the rear, or both, a double cylinder 221 having therein two pistons 222 and 223, which are connected, respectively, to brake shoes 224 and 225 so that the piston of the brake shoes is controlled by the pressure supplied from the line 208, or whichever line is attached thereto. Also, the hydraulic system may be likewise applied to the operation of the clutch and for this purpose the pressure liquid supplied through the pipe 196 will lead to a booster unit 216, constructed the same as the hydraulic unit 46 and having the hydraulic pressure pipe 217 leading to a cylinder 218 having a piston 219 connected to a clutch operating lever 220 for operating the clutch in the same manner as previously described.

Slightly modified circuits for the operation of the apparatus are shown in Figs. 22 and 23, as alternative forms thereof. The circuit in Fig. 22 is the same as Fig. 1, except that in this instance I have shown in the circuit a manually operable switch 226, which may be the ignition switch of the automobile, located on the dash of the automobile and which is bridged by means of a relay 227 across the battery so as to disconnect the current manually, when desired, and except that in this instance there are two automatic circuit breakers 228 and 229 provided in the motor circuit to prevent overloading. The circuit shown in Fig. 23 is constructed the same as the circuit shown in Fig. 22, except that in this instance there is an additional switch 230 and an accompanying relay 231 in the circuit, which switch 230 may be such as to permit the current to be supplied only when the brake or clutch pedal, or stop light lever is moved on the automobile.

In the operation of the apparatus, referring first to the operation of the brakes, when the pedal 26 is moved downwardly, this applies manual pressure to the brakes on the four wheels of the car through the lever 24, link 23, lever 21, link 19, levers 17, 15, 13, 14, and shafts 9 and 12, but this movement will also, through the link 33, lever 35 and lever 76 cause the tubular valve 67 to move inwardly thus communicating the high pressure liquid, which is normally under pressure of 500 lbs. per square inch, from the annual chamber 49 to the interior of the tubular valve 67 and thence to the rear of the plunger 50, which will result in the movement of the plunger 50 to the right, thereby acting on the lever 77 to exert an additional pull on the brake rod 19. This pressure will increase until the pressure of the tubular valve 67 on the lever 76 equalizes the amount of the pressure applied by the foot to the pedal 26, whereupon the tubular valve 67 will close. When the foot pedal is released partially or wholly from the foot pedal 26, the liquid under pressure will escape around the closure 72 and thence through the outlet port 79 by reverse modulation, the same as in forward modulation of the tubular valve 67 movements. This low pressure liquid will pass into the reservoir 82 and thence through the filter cloth 89, which will remove all the accumulated scale and dirt, and thereafter enter the pump, from which, when the current is on, that is to say when the circuit breaker 148 is in its forward position due to the decrease of pressure in the reservoir 141, the rotation of the pump will rapidly build up the pressure so as to further compress the springs 97 until the circuit is again broken by the rollers 166 and 167, passing onto the Bakelite sleeve 171. While the current is on, the dash light 188 will show up but as soon as the current is broken it will, of course, cease to be lighted. The clutch operation will take place in a similar manner by the operation of the clutch pedal lever 26'.

Here the valve 67 is actuated through the lever 190, link 191, lever 193, link 33, lever 35 and lever 76 and the clutch is actuated by the power from the pressure liquid released by this valve 67 to move the piston 64, lever 77, arm 200, link 201 and lever 202 which is on the clutch shaft 203, so as to thus release the clutch when the pedal 26' is depressed.

The hydraulic system will operate in a similar manner also, except that in this instance the power, which acts alone or which acts as a booster, if desired, is conveyed by the tubes to the four-wheel brakes or, if desired, as well to the clutch, so that by the operation of the piston, such as 214, 222, 223 or 219, the various parts are actuated with modulated pressure from the force supplied by the foot to the pedals. In any of these forms of the invention either of the modified circuits in Figs. 22 and 23 may be used, in which event the ignition-switch 226 may be required to be on before the power, above described, can take effect and, if desired, even the clutch or brake pedal or stop light lever may be required to actuate the switch 230, also, before the power can be applied.

While I have described my invention above in detail I wish it to be understood that many changes may be made therein without departing from the spirit of the same.

I claim:

1. In combination, a liquid power booster comprising a reciprocable power applying element, a hydraulic cylinder for applying power in alignment with the reciprocation thereof, having a piston adapted to be controlled by the movement of the reciprocable power applying element, and a leverage controlling mechanism located between the booster and the hydraulic cylinder, resting freely against the power applying element and the hydraulic piston.

2. In combination, a liquid power booster comprising a reciprocable power applying element, a hydraulic cylinder for applying power, having a piston adapted to be controlled by the movement of the reciprocable power applying element, a leverage controlling mechanism between the booster and the hydraulic cylinder, resting freely against the power applying element and the hydraulic piston, and a leverage housing on the booster separable from the booster and hydraulic cylinder.

3. In combination, a liquid power booster comprising a reciprocable power applying element, a hydraulic cylinder for applying power, having a piston adapted to be controlled by the movement of the reciprocable power applying element, a leverage controlling mechanism between the booster and the hydraulic cylinder, resting freely against the power applying element and the hydraulic piston, and a leverage housing on the booster separable from the booster and hydraulic cylinder, said housing having like opposing assembly faces.

4. In combination, a liquid power booster comprising a reciprocable power applying element, a hydraulic cylinder for applying power, having a piston adapted to be controlled by the movement of the reciprocable power applying element, a leverage controlling mechanism between the booster and the hydraulic cylinder, resting freely against the power applying element and the hydraulic piston, a leverage housing on the booster separable from the booster and hydraulic cylinder, said housing having like opposing assembly faces, and an external adapter between the leverage housing and hydraulic cylinder.

5. In combination, a liquid power booster comprising a reciprocable power applying element, a hydraulic cylinder for applying power, having a piston adapted to be controlled by the movement of the reciprocable power applying element, a leverage controlling mechanism between the booster and the hydraulic cylinder, adapted to convey power from the power applying element to the hydraulic piston and resting freely against the power applying element and the hydraulic piston, and a leverage housing on the booster extending from the booster and hydraulic cylinder.

6. In combination, a liquid power booster, means for applying a pressure liquid thereto, a manual means for controlling the application of power thereto so as to produce pressure modulated according to the manual pressure applied, an automobile accessory adapted to be actuated by said modulated pressure plus the manual power applied, another automobile accessory adapted to be actuated merely by said modulated pressure of said pressure liquid, and means controlled by the manual power applied for thus controlling the application of said pressure liquid to said other accessory.

EDWARD A. ROCKWELL.